(12) United States Patent
Inoue et al.

(10) Patent No.: US 11,383,697 B2
(45) Date of Patent: Jul. 12, 2022

(54) VEHICLE CONTROL APPARATUS

(71) Applicant: SUBARU CORPORATION, Tokyo (JP)

(72) Inventors: Satoshi Inoue, Tokyo (JP); Tomoaki Sugiura, Tokyo (JP); Akihiro Nabeshima, Tokyo (JP); Takuya Machida, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 395 days.

(21) Appl. No.: 16/736,509

(22) Filed: Jan. 7, 2020

(65) Prior Publication Data

US 2020/0298830 A1 Sep. 24, 2020

(30) Foreign Application Priority Data

Mar. 20, 2019 (JP) .............................. JP2019-052795

(51) Int. Cl.
*B60W 20/00* (2016.01)
*B60W 10/02* (2006.01)
(Continued)

(52) U.S. Cl.
CPC .............. *B60W 20/40* (2013.01); *B60K 6/24* (2013.01); *B60K 6/26* (2013.01); *B60K 6/38* (2013.01); *B60K 6/543* (2013.01); *B60K 7/0007* (2013.01); *B60W 10/02* (2013.01); *B60W 10/06* (2013.01); *B60W 10/08* (2013.01); *B60W 10/101* (2013.01); *F16H 9/12* (2013.01); *F16H 61/66231* (2013.01); *B60Y 2200/92* (2013.01);
(Continued)

(58) Field of Classification Search
CPC ...... B60W 20/40; B60W 10/02; B60W 10/06; B60W 10/08; B60W 10/101; B60K 6/24; B60K 6/26; B60K 6/38; B60K 6/543; B60K 7/0007; F16H 9/12; F16H 61/66231; F16H 59/44; F16H 59/48; F16H 59/72; F16H 2061/661
See application file for complete search history.

(56) References Cited

U.S. PATENT DOCUMENTS 10,124,796 B2 * 11/2018 Morita ................... B60W 10/06
11,110,790 B2 * 9/2021 Komuro .............. B60L 15/2045
2016/0280217 A1 * 9/2016 Sato ....................... B60W 10/06

FOREIGN PATENT DOCUMENTS

JP 2015-116936 A 6/2015

* cited by examiner

*Primary Examiner* — John D Walters
(74) *Attorney, Agent, or Firm* — McDermott Will & Emery LLP (57) ABSTRACT

A vehicle control apparatus for a vehicle provided with an engine, a continuously variable transmission (CVT) coupled to an output shaft of the engine, a motor coupled to a wheel, and an output clutch that transmits power from an output shaft of the CVT and the motor to the wheel includes a controller that is able to switch and execute either of an EV mode that allows, upon disengagement of the output clutch, power outputted from the motor to drive the wheel, and an HEV mode that allows, upon engagement of the output clutch, power outputted from the engine and the motor to drive the wheel, and that, in an adjustment of a gear ratio of the CVT during the EV mode, engages the output clutch and adjusts the gear ratio of the CVT, and thereafter disengages the output clutch before the gear ratio reaches a target gear ratio.

15 Claims, 6 Drawing Sheets

(51) Int. Cl.
*B60W 10/06* (2006.01)
*B60W 10/08* (2006.01)
*B60K 6/24* (2007.10)
*B60K 6/26* (2007.10)
*B60K 6/38* (2007.10)
*B60W 20/40* (2016.01)
*B60K 7/00* (2006.01)
*B60K 6/543* (2007.10)
*B60W 10/101* (2012.01)
*F16H 9/12* (2006.01)
*F16H 61/662* (2006.01)
*F16H 59/72* (2006.01)
*F16H 59/44* (2006.01)
*F16H 59/48* (2006.01)
*F16H 61/66* (2006.01)

(52) U.S. Cl.
CPC ......... *B60Y 2300/188* (2013.01); *F16H 59/44* (2013.01); *F16H 59/48* (2013.01); *F16H 59/72* (2013.01); *F16H 2061/661* (2013.01); *F16H 2200/0021* (2013.01)

VEHICLE CONTROL APPARATUS

CROSS-REFERENCE TO RELATED APPLICATIONS

The present application claims priority from Japanese Patent Application No. 2019-052795 filed on Mar. 20, 2019, the entire contents of which are hereby incorporated by reference.

BACKGROUND

The disclosure relates to a vehicle control apparatus.

There have been vehicles mounted with an engine and a drive motor as drive sources. Such vehicles have been called hybrid electric vehicles or HEVs. As disclosed in Japanese Unexamined Patent Application Publication (JP-A) No. 2015-116936, for example, such a vehicle sometimes includes an engine, a continuously variable transmission coupled to an output shaft of the engine, a drive motor coupled to drive wheels, and an output clutch that allows and disallows transmission of power between an output shaft of the continuously variable transmission, and the drive wheels and the drive motor.

SUMMARY

An aspect of the disclosure provides a vehicle control apparatus configured to control a vehicle. The vehicle is provided with an engine, a continuously variable transmission coupled to an output shaft of the engine, a drive motor coupled to a drive wheel, and an output clutch that allows and disallows transmission of power between an output shaft of the continuously variable transmission, and the drive wheel and the drive motor. The vehicle control apparatus includes a controller. The controller is able to switch and execute either of an electric vehicle (EV) travel mode that allows, in a state where the output clutch is disengaged, power outputted from the drive motor to drive the drive wheel, and a hybrid electric vehicle (HEV) travel mode that allows, in a state where the output clutch is engaged, both power outputted from the engine and the power outputted from the drive motor to drive the drive wheel. In an adjustment of a gear ratio of the continuously variable transmission during the EV travel mode, the controller engages the output clutch and starts the adjustment of the gear ratio of the continuously variable transmission, and thereafter disengages the output clutch before the gear ratio reaches a target gear ratio.

An aspect of the disclosure provides a vehicle control apparatus configured to control a vehicle. The vehicle is provided with an engine, a continuously variable transmission coupled to an output shaft of the engine, a drive motor coupled to a drive wheel, and an output clutch that allows and disallows transmission of power between an output shaft of the continuously variable transmission, and the drive wheel and the drive motor. The vehicle control apparatus includes circuitry. The circuitry is able to switch and execute either of an electric vehicle (EV) travel mode that allows, in a state where the output clutch is disengaged, power outputted from the drive motor to drive the drive wheel, and a hybrid electric vehicle (HEV) travel mode that allows, in a state where the output clutch is engaged, both power outputted from the engine and the power outputted from the drive motor to drive the drive wheel. In an adjustment of a gear ratio of the continuously variable transmission during the EV travel mode, the circuitry engages the output clutch and starts the adjustment of the gear ratio of the continuously variable transmission, and thereafter disengages the output clutch before the gear ratio reaches a target gear ratio.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

In the following, some example embodiments of the technology are described in detail with reference to the accompanying drawings. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description.

In the vehicle including the output clutch disclosed in JP-A No. 2015-116936 described above, it is possible to switch and execute either of an EV travel mode that allows, in a state where the output clutch is disengaged, power outputted from the drive motor to drive the drive wheels, and an HEV travel mode that allows, in a state where the output clutch is engaged, power outputted from the engine and the drive motor to drive the drive wheels. Upon disengagement of the output clutch during execution of the EV travel mode, no power is transmitted between the drive wheels, and the continuously variable transmission and the engine, making it possible to decrease an energy loss due to that the continuously variable transmission and the engine are both rotated.

It is conceivable that, during execution of the EV travel mode described above, no change in speed of power by the continuously variable transmission takes place, but an adjustment of a gear ratio of the continuously variable transmission takes place. For example, in a case where the vehicle re-starts by using power outputted from the engine after the vehicle has come to a halt in a state where the gear ratio is too close to a high speed side, there can be a decrease in ease of start due to a lack of power to be transmitted to the drive wheels. It is conceivable that, to suppress a decrease in ease of start when re-starting, the gear ratio is adjusted to a lowest speed gear ratio before the vehicle comes to a halt.

The output clutch is basically disengaged during execution of the EV travel mode described above. The primary shaft and the secondary shaft of the continuously variable transmission are thus stopped from rotating. In an adjustment of the gear ratio, it is thus necessary to engage the output clutch, leading to an energy loss due to that at least the continuously variable transmission is rotated. Such an energy loss due to an adjustment of the gear ratio can lead to a decrease in energy efficiency, i.e., fuel consumption and electric power consumption, of the vehicle.

The disclosure provides a novel, improved vehicle control apparatus that is able to appropriately suppress a decrease in energy efficiency due to an adjustment of a gear ratio of the continuously variable transmission during execution of the EV travel mode.

1. Configuration of Power Transmission System

Figure 1:
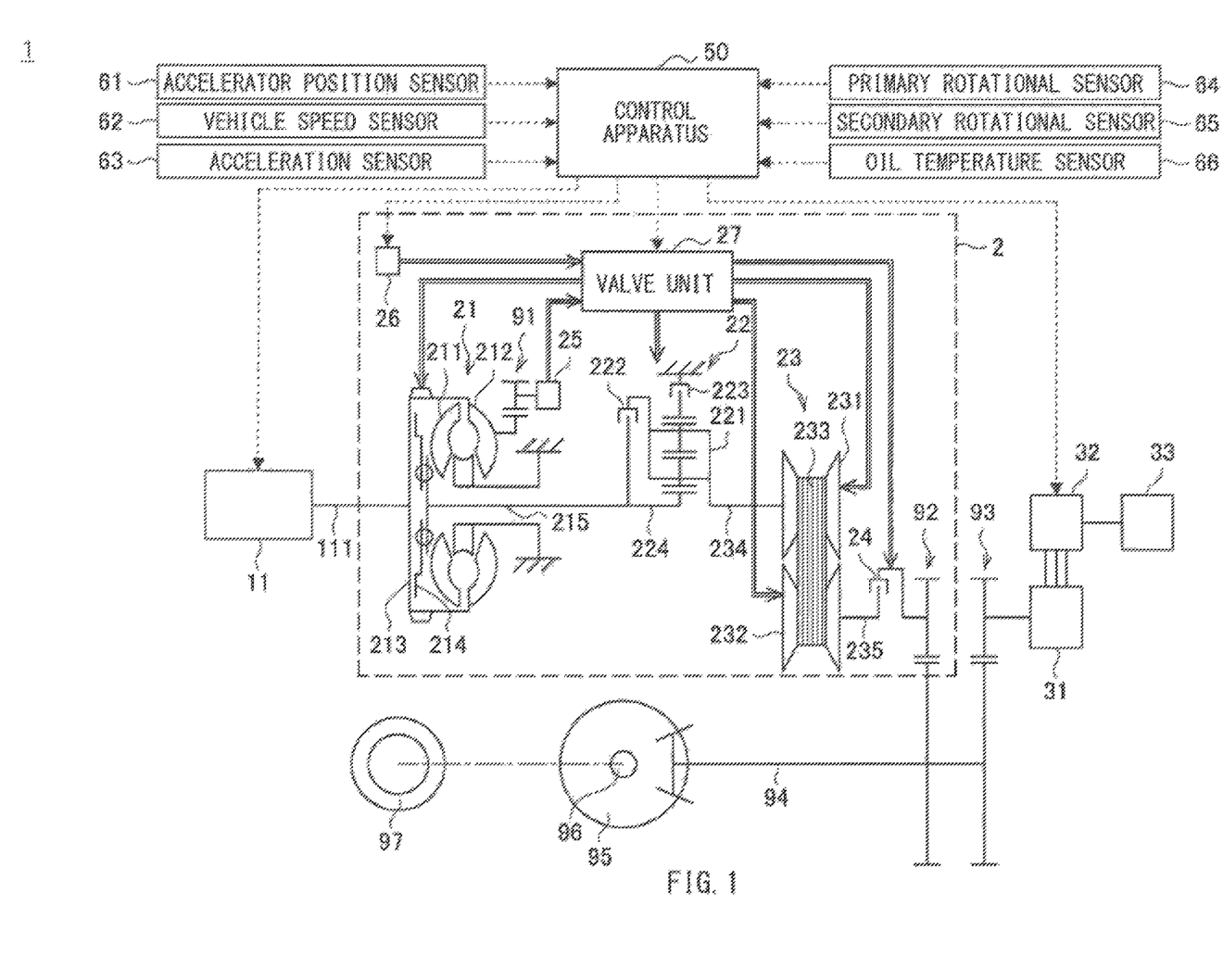
FIG. 1 is a schematic view illustrating an outline configuration of a power transmission system of a vehicle mounted with a vehicle control apparatus according to one example embodiment of the disclosure.
Figure 2:
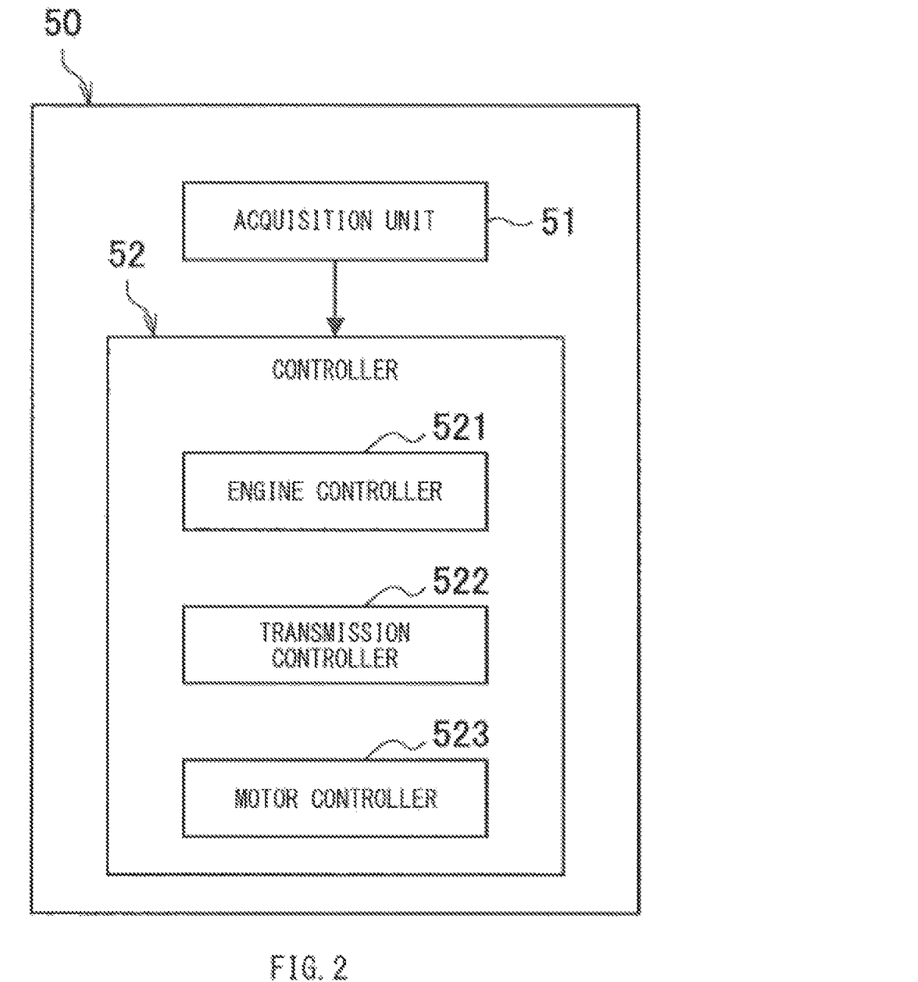
FIG. 2 is a block diagram illustrating an example of a configuration of the vehicle control apparatus illustrated in FIG. 1.

With reference to FIGS. 1 and 2, a configuration of a power transmission system 1 of a vehicle mounted with a control apparatus 50 according to an example embodiment of the disclosure will now be described below.

FIG. 1 is a schematic view illustrating an outline configuration of the power transmission system 1. FIG. 2 is a block diagram illustrating an example of a configuration of the control apparatus 50.

The power transmission system 1 may be mounted in the vehicle. As illustrated in FIG. 1, the power transmission system 1 may include an engine 11, a continuously variable transmission (CVT) 23, a drive motor 31, and an output clutch 24. The engine 11 includes a crank shaft 111 serving as an output shaft. The CVT 23 includes a secondary shaft 235 serving as an output shaft coupled to the crank shaft 111. The drive motor 31 is coupled to drive wheels 97. The output clutch 24 may allow and disallow power to be transmitted between the secondary shaft 235, and the drive wheels 97 and the drive motor 31. In one embodiment, the CVT 23 may serve as a "continuously variable transmission".

In a specific but non-limiting example, the engine 11 may be coupled to the drive wheels 97 via an automatic transmission 2 including the CVT 23 in the power transmission system 1. In the automatic transmission 2, a torque converter 21, a forward-backward switching mechanism 22, the CVT 23, and the output clutch 24 may be sequentially coupled to each other in order from the engine 11. Power outputted from the engine 11 may be transmitted to the forward-backward switching mechanism 22 via the torque converter 21. A rotational direction of the power may be switched to a forward direction or a backward direction by the forward-backward switching mechanism 22. The power may thus be transmitted to the CVT 23. The power transmitted to the CVT 23 may be changed in speed by the CVT 23. The power may then be outputted toward the drive wheels 97. The power outputted from the CVT 23 may be transmitted to the drive wheels 97 via the output clutch 24, a drive shaft 94, a differential gear 95, and an axle 96.

The engine 11 may be an internal combustion engine that uses gasoline, for example, as fuel to generate power. The engine 11 may include the crank shaft 111. The crank shaft 111 may serve as the output shaft of the engine 11. The crank shaft 111 may be coupled to the torque converter 21.

The torque converter 21 may include a pump impeller 212 and a turbine runner 211. The pump impeller 212 may be coupled to the crank shaft 111 of the engine 11 via a front cover 213. The turbine runner 211 may face the pump impeller 212. The turbine runner 211 may be coupled to a turbine shaft 215. Hydraulic oil may be supplied in the torque converter 21. Via the hydraulic oil, power outputted from the engine 11 may be transmitted from the pump impeller 212 to the turbine runner 211. A lock-up clutch 214 may be provided in the torque converter 21. The lock-up clutch 214 may be configured to directly couple the crank shaft 111 of the engine 11 and the turbine shaft 215. The turbine shaft 215 may be coupled to the forward-backward switching mechanism 22.

In a case where the lock-up clutch 214 is disengaged, i.e., in a case where a lock-up state of the torque converter 21 is canceled, power outputted from the engine 11 may be transmitted to the forward-backward switching mechanism 22 via the hydraulic oil. On the other hand, in a case where the lock-up clutch 214 is engaged, i.e., in a case where the torque converter 21 is in the lock-up state, power outputted from the engine 11 may be directly transmitted to the forward-backward switching mechanism 22.

To the pump impeller 212 may be coupled a mechanical oil pump 25 via a gear train 91. The mechanical oil pump 25 may be driven as the crank shaft 111 of the engine 11 rotates. The mechanical oil pump 25 may thus generate hydraulic pressure to be supplied to a valve unit 27 provided in the automatic transmission 2. The valve unit 27 may be coupled to the torque converter 21, the forward-backward switching mechanism 22, the CVT 23, and the output clutch 24 via oil paths. It is possible in the valve unit 27 to adjust hydraulic pressure to be supplied to the devices. The valve unit 27 may be provided with control valves. The control valves may control hydraulic pressure to be supplied to the devices. In a specific but non-limiting example, the control valves may be proportional electromagnetic control valves.

It is also possible in the automatic transmission 2 to use an electric oil pump 26 to generate hydraulic pressure to be supplied to the valve unit 27. In a specific but non-limiting example, the electric oil pump 26 may include a motor. The motor may drive the electric oil pump 26.

The forward-backward switching mechanism 22 may include a planetary gear 221, a forward clutch 222, and a backward brake 223. The forward-backward switching mechanism 22 may be coupled to a primary shaft 234 of the CVT 23. It is possible in the forward-backward switching mechanism 22 to switch a rotational direction of the primary shaft 234 of the CVT 23 in accordance with engagement states of the forward clutch 222 and the backward brake 223. In a case where the forward clutch 222 is engaged and the backward brake 223 is disengaged, an input shaft 224 coupled to the turbine shaft 215 may be directly coupled to the primary shaft 234, rotating the primary shaft 234 in a normal direction. This makes it possible to allow the vehicle to travel forward. In a case where the forward clutch 222 is disengaged and the backward brake 223 is engaged, the input shaft 224 may be coupled to the primary shaft 234 via the planetary gear 221, rotating the primary shaft 234 in a reverse direction. This makes it possible to allow the vehicle to travel backward.

In a case where the forward clutch 222 and the backward brake 223 are both disengaged, such a state may be attained that no power is transmitted from the engine 11 to the primary shaft 234. In a case where either of the forward clutch 222 and the backward brake 223 is engaged, as described above, such a state may be attained that power is transmitted from the engine 11 to the primary shaft 234. It is therefore possible in the forward-backward switching mechanism 22 to allow and disallow power to be transmitted between the engine 11 and the CVT 23. The state where the forward clutch 222 and the backward brake 223 are both disengaged may correspond to a state where the forward-backward switching mechanism 22 is disengaged. The state where either of the forward clutch 222 and the backward brake 223 is engaged may correspond to a state where the forward-backward switching mechanism 22 is engaged.

The CVT 23 may include a primary pulley 231, a secondary pulley 232, a chain 233, the primary shaft 234, and the secondary shaft 235. The primary shaft 234 may serve as an input shaft that receives power. The secondary shaft 235 may serve as the output shaft that outputs power. The primary shaft 234 and the secondary shaft 235 may be arranged in parallel with each other. The primary pulley 231 may be secured to the primary shaft 234. The secondary pulley 232 may be secured to the secondary shaft 235. The primary pulley 231 and the secondary pulley 232 may be wound with the chain 233. The chain 233 may transmit power between the primary pulley 231 and the secondary pulley 232. Each of the pulleys may be provided with a fixed sheave and a movable sheave. The fixed sheave and the movable sheave may pinch the chain 233.

Hydraulic pressure to be supplied to each of the pulleys may push the movable sheave toward the fixed sheave, pinching the chain 233. As hydraulic pressure to be supplied to the pulleys is adjusted, pressure at which the chain 233 is pinched by the pulleys may be adjusted. This makes it possible to adjust a radius at which the chain 233 is wound onto each of the pulleys. This makes it possible to adjust a gear ratio of the CVT 23. The CVT 23 may change in speed power inputted to the primary shaft 234 at the gear ratio adjusted as described above. The CVT 23 may then output the changed power to the secondary shaft 235. The secondary shaft 235 may be coupled to the drive shaft 94 via the output clutch 24 and a gear train 92. The drive shaft 94 may be coupled to the drive motor 31 via a gear train 93.

In a specific but non-limiting example, the output clutch 24 may allow and disallow power to be transmitted between the secondary shaft 235 and the drive shaft 94. In a specific but non-limiting example, the output clutch 24 may be a friction clutch. In a case where the output clutch 24 is engaged, power may be transmitted between the secondary shaft 235 and the drive shaft 94. On the other hand, in a case where the output clutch 24 is disengaged, no power may be transmitted between the secondary shaft 235 and the drive shaft 94.

In a specific but non-limiting example, the drive motor 31 may be a multi-phase alternating current motor, such as a three-phase alternating current motor. The drive motor 31 may be coupled to a battery 33 via an inverter 32. The drive motor 31 may be configured to generate power when driven with electric power of the battery 33. In other words, the drive motor 31 may be power-driven. Power outputted from the drive motor 31 may be transmitted to the drive shaft 94 via the gear train 93. The drive motor 31 may serve as a generator that is driven in a regenerative manner during deceleration of the vehicle to generate electric power with kinetic energy of the drive wheels 97. Electric power generated by the drive motor 31 as described above may be supplied to the battery 33 via the inverter 32. The electric power may thus be used to charge the battery 33.

The drive shaft 94 may be coupled to the drive wheels 97 via the differential gear 95 and the axle 96. Power outputted from the drive motor 31 and transmitted to the drive shaft 94 and power outputted from the engine 11 and transmitted to the drive shaft 94 via the output clutch 24 may be distributed by the differential gear 95 and transmitted to the drive wheels 97 on left and right sides via the axle 96. The drive wheels 97 may be front wheels or rear wheels. The drive shaft 94 may be coupled to a propeller shaft. The propeller shaft is not illustrated. In such a case, power transmitted to the drive shaft 94 may be transmitted to all of the front wheels and the rear wheels.

The power transmission system 1 may be provided with various kinds of sensors. In a specific but non-limiting example, the power transmission system 1 may include an accelerator position sensor 61, a vehicle speed sensor 62, an acceleration sensor 63, a primary rotational sensor 64, a secondary rotational sensor 65, and an oil temperature sensor 66.

The accelerator position sensor 61 may detect an accelerator position corresponding to how much an accelerator pedal is operated by a driver, and may then output a result of detection.

The vehicle speed sensor 62 may detect a vehicle speed indicative of a speed of the vehicle, and may then output a result of detection.

The acceleration sensor 63 may detect how much the vehicle is accelerating, and may then output a result of detection.

The primary rotational sensor 64 may detect a speed of the primary shaft 234, and may then output a result of detection.

The secondary rotational sensor 65 may detect a speed of the secondary shaft 235, and may then output a result of detection.

The oil temperature sensor 66 may detect an oil temperature indicative of a temperature of oil in a case accommodating the CVT 23, i.e., a case of the automatic transmission 2, and may then output a result of detection.

The control apparatus 50 may control operation of the devices in the power transmission system 1.

In a specific but non-limiting example, the control apparatus 50 may include, for example, circuitry including a central processing unit (CPU), a read only memory (ROM), and a random access memory (RAM). The CPU may be an arithmetic processing unit. The ROM may be a storage element that stores programs and arithmetic parameters, for example, used by the CPU. The RAM may be a storage element that temporarily stores parameters, for example, that appropriately change during execution by the CPU.

The control apparatus 50 may communicate with the devices in the power transmission system 1. Communications between the control apparatus 50 and the devices may be achieved by using, for example, controller area network (CAN) communications. For example, the control apparatus 50 may communicate with the engine 11, the electric oil pump 26, the valve unit 27, the inverter 32, and the sensors in the power transmission system 1.

The operations of the control apparatus 50 may be divided to be achieved by a plurality of control apparatuses. In such a case, the plurality of control apparatuses may be coupled to each other via a communication bus such as a CAN. For example, operations of the control apparatus 50, regarding control of the engine 11, control of the automatic transmission 2, and control of the drive motor 31, may be divided and respectively achieved by control apparatuses different from each other.

The control apparatus 50 may include an acquisition unit 51 and a controller 52, as illustrated in FIG. 2, for example.

The acquisition unit 51 may acquire various kinds of information used in processes performed by the control apparatus 50. The acquisition unit 51 may then output the acquired information to the controller 52. For example, the acquisition unit 51 may communicate with the sensors in the power transmission system 1 to acquire results of detection outputted by the sensors.

The controller 52 may use the information acquired by the acquisition unit 51 to execute the processes. In a specific but non-limiting example, the controller 52 may control operation of each of the engine 11, the automatic transmission 2, and the drive motor 31, in accordance with a travel state of the vehicle.

The controller 52 may include an engine controller 521, a transmission controller 522, and a motor controller 523, for example.

The engine controller 521 may control operation of the engine 11. In a specific but non-limiting example, the engine controller 521 may control operation of the devices in the engine 11 to control throttle positions, ignition timings, and fuel injection amounts, for example. This therefore makes it possible to control output of the engine 11.

The transmission controller 522 may control operation of the devices in the automatic transmission 2. In a specific but non-limiting example, the transmission controller 522 may control operation of the valve unit 27 to control operation of the torque converter 21, the forward-backward switching mechanism 22, the CVT 23, and the output clutch 24. This therefore makes it possible to respectively control an engagement state of the lock-up clutch 214 of the torque converter 21, an engagement state of the forward-backward switching mechanism 22, the gear ratio of the CVT 23, and an engagement state of the output clutch 24. In a specific but non-limiting example, control of the gear ratio of the CVT 23 by the transmission controller 522 may be achieved by using a result of detection of the speed of the primary shaft 234 and the speed of the secondary shaft 235. The transmission controller 522 may control operation of the motor of the electric oil pump 26 to control driving of the electric oil pump 26.

The motor controller 523 may control operation of the drive motor 31. In a specific but non-limiting example, the motor controller 523 may control operation of the inverter 32 to control supplying of electric power between the drive motor 31 and the battery 33. This therefore makes it possible to control generation of power and electric power by the drive motor 31.

The controller 52 may control operation of the engine 11, the automatic transmission 2, and the drive motor 31, as described above, making it possible to switch and execute, as a travel mode of the vehicle, an EV travel mode and an HEV travel mode. The EV travel mode may be a travel mode where, in a state where the output clutch 24 is disengaged, the drive wheels 97 are driven with power outputted from the drive motor 31. The HEV travel mode may be a travel mode where, in a state where the output clutch 24 is engaged, the drive wheels 97 are driven with power outputted from the engine 11 and the drive motor 31.

With the control apparatus 50 according to the example embodiment, the controller 52 may perform control regarding an adjustment of the gear ratio of the CVT 23 during the EV travel mode. This makes it possible to appropriately suppress a decrease in energy efficiency due to an adjustment of the gear ratio of the CVT 23 during the EV travel mode. Such control regarding an adjustment of the gear ratio of the CVT 23 during the EV travel mode will be described below in detail.

2. Operation of Control Apparatus

Next, operation of the control apparatus 50 according to the example embodiment of the disclosure will be described below with reference to FIGS. 3 to 6.

[2-1. Control Regarding Switching of Travel Mode]

Control regarding how the control apparatus 50 switches the travel mode will first be described below with reference to FIGS. 3 and 4.

As described above, it is possible in the controller 52 to switch and execute either of the EV travel mode and the HEV travel mode, as the travel mode of the vehicle.

In a specific but non-limiting example, the controller 52 may switch the travel mode of the vehicle on the basis of a requested driving force indicative of a value at which power to be transmitted to the drive wheels 97 is requested. For example, the controller 52 may switch the travel mode of the vehicle to the HEV travel mode in a case where a requested driving force is greater than a reference driving force. On the other hand, the controller 52 may switch the travel mode of the vehicle to the EV travel mode in a case where a requested driving force is equal to or below the reference driving force. The reference driving force may be set to a value smaller than a maximum value at which the drive motor 31 is able to transmit power to the drive wheels 97. In terms of improving electric power consumption, for example, the reference driving force may be set in accordance with specifications and other features of the drive motor 31. It is possible in the controller 52 to calculate a requested driving force on the basis of the accelerator position and the vehicle speed, for example.

Figure 3:
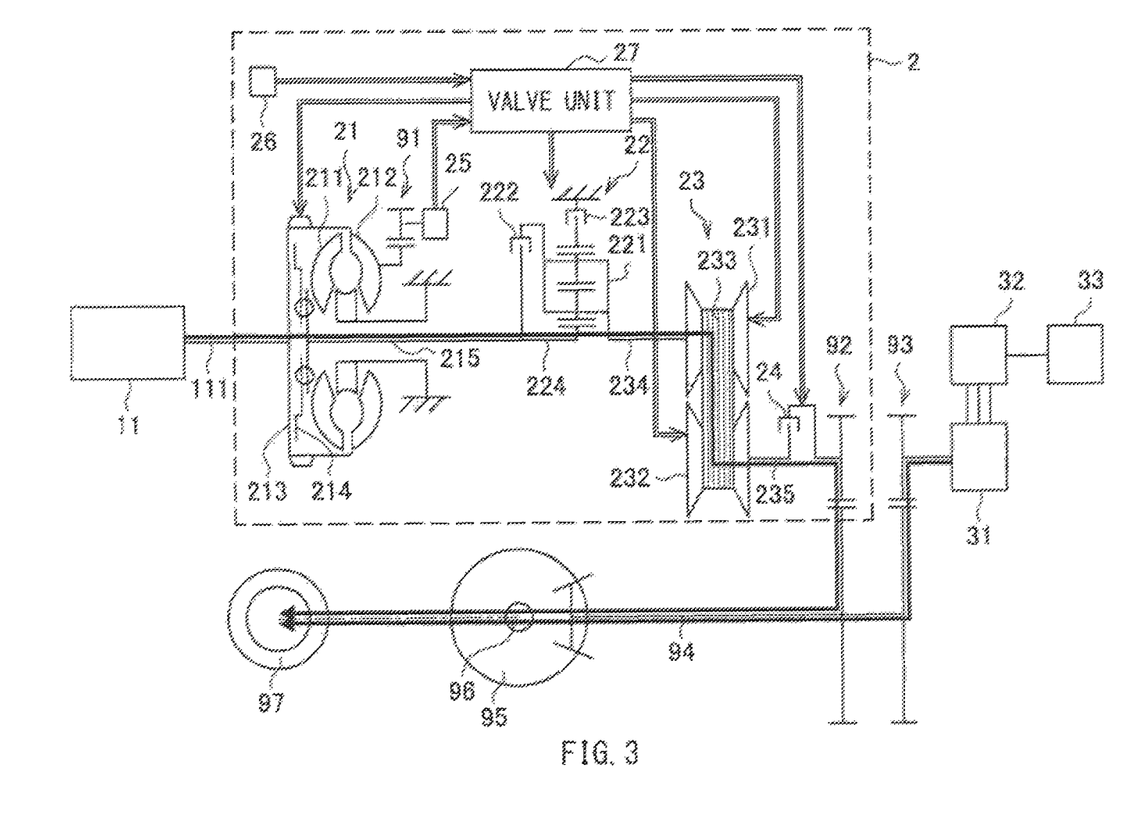
FIG. 3 is a schematic view illustrating a power transmission state during the HEV travel mode in the power transmission system of the vehicle illustrated in FIG. 1.

FIG. 3 is a schematic view illustrating a power transmission state during the HEV travel mode in the power transmission system 1. In FIGS. 3 and 4 described below, power transmission routes are indicated by bold arrows.

In the HEV travel mode, the transmission controller 522 of the controller 52 may engage the forward-backward switching mechanism 22 and the output clutch 24. The engine controller 521 and the motor controller 523 of the controller 52 may cooperate with each other and may control output of each of the engine 11 and the drive motor 31 to allow power to be transmitted to the drive wheels 97 to satisfy a requested driving force. As illustrated in FIG. 3, this makes it possible to allow power outputted from the engine 11 to be transmitted to the drive wheels 97 via the CVT 23, as well as to allow power outputted from the drive motor 31 to be transmitted to the drive wheels 97. As described above, in the HEV travel mode, the drive wheels 97 may be driven with power outputted from the engine 11 and the drive motor 31 in a state where the output clutch 24 is engaged.

The transmission controller 522 of the controller 52 may determine a target gear ratio indicative of a target value of the gear ratio on the basis of the vehicle speed and the accelerator position during the HEV travel mode to control and make the gear ratio of the CVT 23 close to the target gear ratio.

Figure 4:
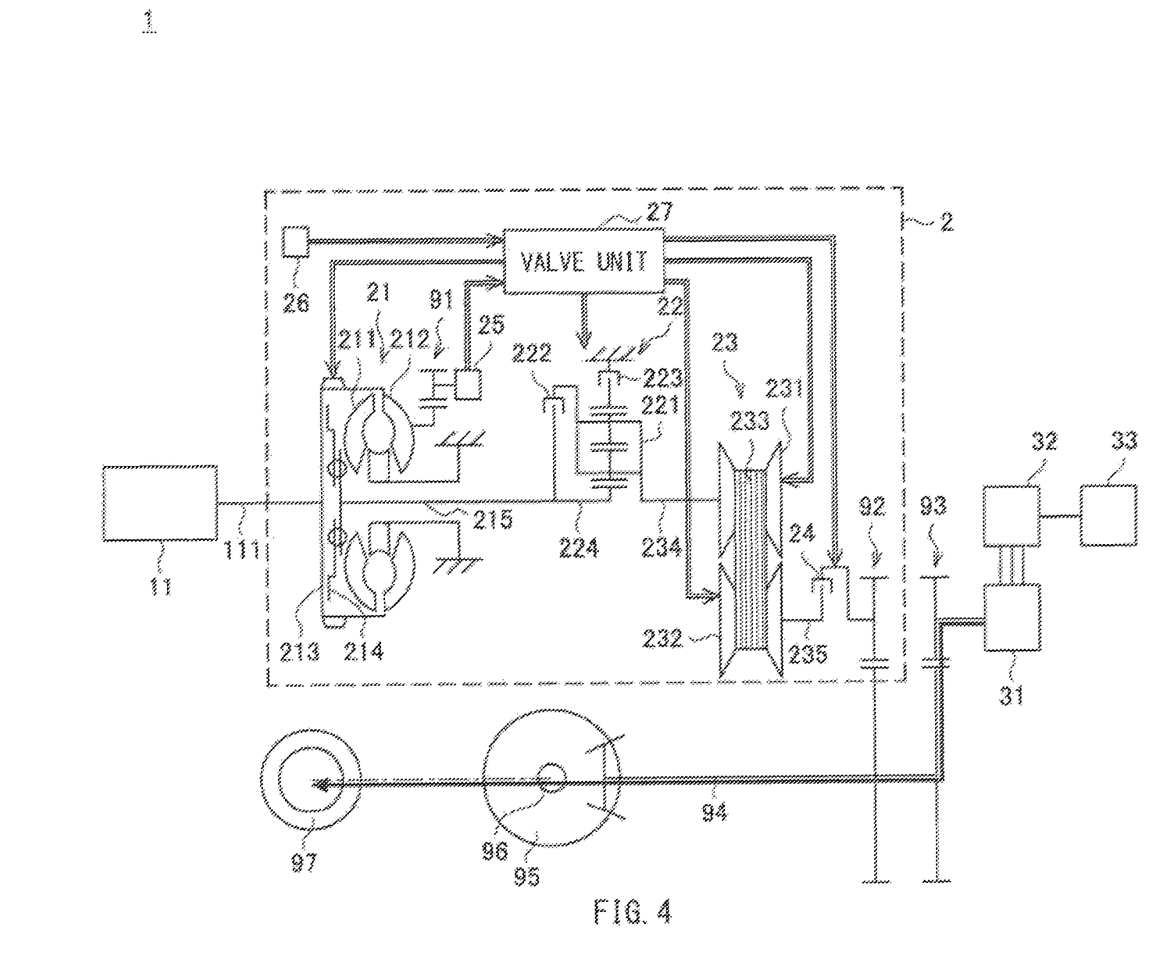
FIG. 4 is a schematic view illustrating a power transmission state during the EV travel mode in the power transmission system of the vehicle illustrated in FIG. 1.

FIG. 4 is a schematic view illustrating a power transmission state during the EV travel mode in the power transmission system 1.

In the EV travel mode, the transmission controller 522 of the controller 52 may basically disengage the forward-backward switching mechanism 22 and the output clutch 24. The engine controller 521 of the controller 52 may stop the engine 11. The motor controller 523 may control output of the drive motor 31 to allow power to be transmitted to the drive wheels 97 to satisfy a requested driving force. As illustrated in FIG. 4, this makes it possible to allow power outputted from the drive motor 31 to be transmitted to the drive wheels 97 in a state where the engine 11 is stopped. As described above, in the EV travel mode, the drive wheels 97 may be driven with power outputted from the drive motor 31 in a state where the output clutch 24 is disengaged. With the output clutch 24 being disengaged during the EV travel mode, it is possible to decrease an energy loss due to that the CVT 23 and the engine 11 are both rotated.

As the engine 11 is stopped during the EV travel mode, the mechanical oil pump 25 may also be stopped. The transmission controller 522 of the controller 52 may therefore drive the electric oil pump 26 to generate hydraulic pressure to be supplied to the valve unit 27. This makes it possible to control operation of the devices in the automatic transmission 2.

Under certain conditions during the EV travel mode, e.g., in a case where the vehicle speed has lowered below a threshold, as will be described below, the transmission controller 522 of the controller 52 may adjust the gear ratio of the CVT 23. In an adjustment of the gear ratio of the CVT 23 during the EV travel mode, the transmission controller 522 may engage the output clutch 24 and may start an adjustment of the gear ratio of the CVT 23, and thereafter may disengage the output clutch 24 before the gear ratio reaches a target gear ratio, i.e., a target value for the gear ratio, as will be described below.

[2-2. Control Regarding Adjustment of Gear Ratio During EV Travel Mode]

Next, how the control apparatus 50 performs control regarding an adjustment of the gear ratio of the CVT 23 during the EV travel mode will be described below with reference to FIGS. 5 and 6.

Figure 5:
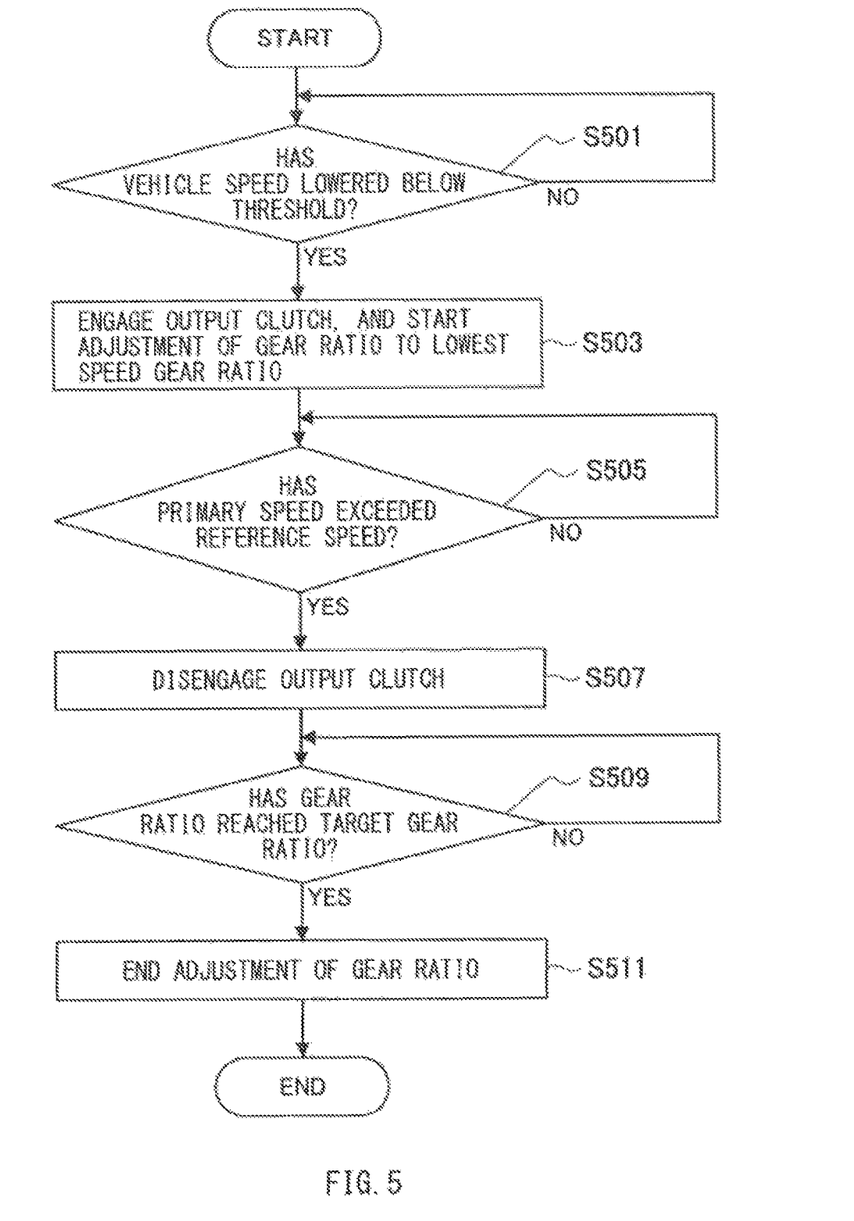
FIG. 5 is a flowchart illustrating an example of a flow of processes performed by the vehicle control apparatus illustrated in FIG. 1.

FIG. 5 is a flowchart illustrating an example of a flow of processes performed by the control apparatus 50. In a specific but non-limiting example, a control flow illustrated in FIG. 5 may be executed during the EV travel mode. For example, the control flow may start when the travel mode is switched from the HEV travel mode to the EV travel mode.

Upon start of the control flow illustrated in FIG. 5, the controller 52 may first determine whether the vehicle speed has lowered below the threshold at step S501. In a case where it is determined that the vehicle speed has lowered below the threshold (YES at step S501), the control flow may proceed to step S503. In a case where it is not determined that the vehicle speed has lowered below the threshold (NO at step S501), the determination process at step S501 may be repeated.

In a specific but non-limiting example, the threshold may be set to such a value, as 35 km/h, that it is possible to determine whether the vehicle speed has lowered to an extent that the vehicle is predicted to soon come to a halt. That is, in a case where the vehicle speed has lowered below the threshold, the vehicle is predicted to soon come to a halt.

In a case where YES is determined at step S501, the transmission controller 522 of the controller 52 may engage the output clutch 24 and may start an adjustment of the gear ratio of the CVT 23 to a lowest speed gear ratio at step S503.

The lowest speed gear ratio may be such a gear ratio that a rate of change in engine speed with respect to the vehicle speed is maximum. The lowest speed gear ratio may correspond to a target gear ratio used when an adjustment of the gear ratio is performed in a case where the vehicle speed has lowered below the threshold during the EV travel mode.

By adjusting beforehand the gear ratio to the lowest speed gear ratio before the vehicle comes to a halt in a case where the vehicle speed has lowered below the threshold, i.e., in a case where the vehicle is predicted to soon come to a halt, as described above, it is possible to suppress the vehicle from re-starting with power outputted from the engine 11 after the vehicle has come to a halt in a state where the gear ratio is too close to a high speed side. It is therefore possible to suppress a decrease in ease of start due to a lack of power to be transmitted to the drive wheels 97 when re-starting. It is also possible to suppress the vehicle from re-accelerating with power outputted from the engine 11 by the travel mode being switched to the HEV travel mode in a state where the gear ratio is too close to the high speed side in a case where the vehicle speed is relatively low. This makes it possible to suppress a decrease in acceleration due to a lack of power to be transmitted to the drive wheels 97 when re-accelerating.

The output clutch 24 may be basically disengaged during the EV travel mode, as described above. The primary shaft 234 and the secondary shaft 235 may thus be stopped from rotating. In a case where the output clutch 24 is engaged in this state, power may be transmitted from the drive wheels 97 to the CVT 23 via the output clutch 24. This makes it possible to rotate the primary shaft 234 and the secondary shaft 235. This also makes it possible to appropriately adjust the gear ratio by using a result of detection of the speed of the primary shaft 234 and the speed of the secondary shaft 235.

In terms of appropriately completing an adjustment of the gear ratio before the vehicle comes to a halt, the transmission controller 522 may adjust the gear ratio by changing a speed of change in gear ratio on the basis of deceleration of the vehicle. In a specific but non-limiting example, the transmission controller 522 may increase a speed of change in gear ratio, in a case where deceleration of the vehicle is greater, since the greater the deceleration of the vehicle, the shorter the time from when an adjustment of the gear ratio starts to when the vehicle comes to a halt. It is possible in the control apparatus 50 to acquire deceleration of the vehicle on the basis of a result of detection outputted from the acceleration sensor 63.

Upon start of the adjustment of the gear ratio at step S503, the speed of the primary shaft 234 may increase as the gear ratio increases toward the lowest speed gear ratio.

Next, the controller 52 may determine, at step S505, whether the speed of the primary shaft 234 has exceeded a reference speed. In a case where it is determined that the speed of the primary shaft 234 has exceeded the reference speed (YES at step S505), the control flow may proceed to step S507. On the other hand, in a case where it is not determined that the speed of the primary shaft 234 has exceeded the reference speed (NO at step S505), the determination process at step S505 may be repeated.

In a case where YES is determined at step S505, the output clutch 24 may be disengaged, as will be described below. The reference speed described above may be set to such a value that it is possible to disengage the output clutch 24 before the gear ratio reaches the lowest speed gear ratio serving as a target gear ratio. After the output clutch 24 has been disengaged, rotational inertia that allows the pulleys of the CVT 23 to keep rotational motions may be utilized to adjust the gear ratio.

As described above, a timing of disengaging the output clutch 24 after start of an adjustment of the gear ratio may depend on the reference speed in the control flow illustrated in FIG. 5. In a specific but non-limiting example, in a case where the reference speed is lower, the output clutch 24 may be disengaged at earlier timing, i.e., timing at which the gear ratio is farther from the lowest speed gear ratio. Meanwhile, in a case where the reference speed is higher, the output clutch 24 may be disengaged at later timing, i.e., timing at which the gear ratio is closer to the lowest speed gear ratio. In a specific but non-limiting example, the reference speed may be set to such a value that allows the pulleys of the CVT 23 to keep rotational motions until at least an adjustment of the gear ratio is completed after the output clutch 24 is disengaged.

In a case where YES is determined at step S505, the transmission controller 522 of the controller 52 may disengage the output clutch 24 at step S507. This makes it possible to cause no power to be transmitted from the drive wheels 97 to the CVT 23, allowing the gear ratio to be continuously adjusted in a state where the pulleys of the CVT 23 keep rotational motions by inertia.

With the controller 52 of the control apparatus 50, the output clutch 24 may be disengaged before the gear ratio reaches the target gear ratio of the CVT 23 after start of an adjustment of the gear ratio, as described above. This makes it possible, in an adjustment of the gear ratio of the CVT 23 during the EV travel mode, to utilize rotational inertia of the pulleys of the CVT 23 to continue the adjustment of the gear ratio, and to shorten a time during which the output clutch 24 is engaged. This therefore makes it possible, in an adjustment of the gear ratio during the EV travel mode, to decrease an energy loss due to that the CVT 23 is rotated. It is therefore also possible to appropriately suppress a decrease in energy efficiency due to an adjustment of the gear ratio of the CVT 23 during the EV travel mode.

In the control flow illustrated in FIG. 5, a timing of disengaging the output clutch 24 after start of an adjustment of the gear ratio may depend on the reference speed, as described above. This therefore makes it possible to change a timing of disengaging the output clutch 24 by changing the reference speed.

If a timing of disengaging the output clutch 24 is too early, the pulleys of the CVT 23 may start rotating by inertia at an earlier timing at which the gear ratio is too far from the lowest speed gear ratio. As a result, it may be difficult to keep rotational motions of the pulleys of the CVT 23 until an adjustment of the gear ratio is completed. On the other hand, if a timing of disengaging the output clutch 24 is too late, the pulleys of the CVT 23 may start rotating by inertia at a timing at which the gear ratio is too close to the lowest speed gear ratio. As a result, there can be a decrease in effects of decreasing an energy loss due to that the CVT 23 is rotated. It is therefore desirable, in one example embodiment, to make appropriate a timing of disengaging the output clutch 24 to prevent the timing from becoming too early or late.

In terms of making appropriate a timing of disengaging the output clutch 24, for example, the transmission controller 522 may change, in an adjustment of the gear ratio of the CVT 23 during the EV travel mode, a timing of disengaging the output clutch 24 after start of an adjustment of the CVT 23 on the basis of the oil temperature indicative of the temperature of the oil in the case accommodating the CVT 23. Since the higher the oil temperature, the lower the viscosity of oil, it is possible to easily allow the pulleys of the CVT 23 being in contact with the oil in the case to keep rotational motions by inertia. In a specific but non-limiting example, therefore, the transmission controller 522 may make earlier a timing of disengaging the output clutch 24 while the oil temperature is higher. By lowering the reference speed while the oil temperature is higher, for example, it is possible to make earlier a timing of disengaging the output clutch 24.

In terms of a similar reason as described above, for example, the transmission controller 522 may change, in an adjustment of the gear ratio of the CVT 23 during the EV travel mode, a timing of disengaging the output clutch 24 after start of the adjustment of the CVT 23 on the basis of deceleration of the vehicle. In terms of appropriately completing an adjustment of the gear ratio before the vehicle comes to a halt, a speed of change in gear ratio may be increased when deceleration is greater, as described above. In a specific but non-limiting example, in a case where a speed of change in gear ratio is changed on the basis of deceleration, as described above, the transmission controller 522 may make earlier a timing of disengaging the output clutch 24 when deceleration is greater. By lowering the reference speed when deceleration is greater, for example, it is possible to make earlier a timing of disengaging the output clutch 24.

Next, the controller 52 may determine, at step S509, whether the gear ratio of the CVT 23 has reached the target gear ratio. In a specific but non-limiting example, the target gear ratio may be the lowest speed gear ratio. In a case where it is determined that the gear ratio has reached the target gear ratio (YES at step S509), the control flow may proceed to step S511. In a case where it is not determined that the gear ratio has reached the target gear ratio (NO at step S509), the determination process at step S509 may be repeated.

In a case where YES is determined at step S509, the transmission controller 522 of the controller 52 may end the adjustment of the gear ratio of the CVT 23 at step S511.

Next, the control flow illustrated in FIG. 5 may end.

In the control flow illustrated in FIG. 5, the controller 52 may adjust the gear ratio of the CVT 23 to the lowest speed gear ratio as a target gear ratio in a case where the vehicle speed has lowered below the threshold during the EV travel mode, as described above. This makes it possible to suppress a decrease in ease of start when the vehicle uses power outputted from the engine 11 to re-start or in acceleration during re-acceleration.

The gear ratio may be adjusted in a case where another condition than the condition that the vehicle speed has lowered below the threshold is satisfied during the EV travel mode. In a case where the threshold described above is designated as a first threshold, for example, the controller 52 may adjust the gear ratio of the CVT 23 to a high speed side gear ratio as a target gear ratio in a case where the vehicle speed has exceeded a second threshold greater than the first threshold, such as 45 km/h, during the EV travel mode.

The high speed side gear ratio may correspond to a gear ratio at which a rate of change in engine speed is smaller with respect to the vehicle speed. For example, the high speed side gear ratio may be a fastest speed gear ratio at which a rate of change in engine speed is minimum with respect to the vehicle speed, or a gear ratio around the fastest speed gear ratio.

By allowing such an event that the vehicle speed has exceeded the second threshold during the EV travel mode to trigger an adjustment of the gear ratio to a high speed side gear ratio, it is possible to suppress switching to the HEV travel mode in a state where the vehicle speed is relatively higher and the gear ratio is too close to a low speed side. It is therefore possible to suppress over rotation where the speed of the primary shaft 234 becomes excessive due to switching to the HEV travel mode.

Also in an adjustment of the gear ratio of the CVT 23, triggered by such an event that the vehicle speed has exceeded the second threshold, the output clutch 24 may be engaged, and the adjustment of the gear ratio may also be started. The output clutch 24 may thereafter be disengaged before the gear ratio reaches a target gear ratio. This makes it possible to suppress the CVT 23 from being rotated by the drive wheels 97. This therefore makes it possible to decrease an energy loss due to that the CVT 23 is rotated in an adjustment of the gear ratio during the EV travel mode. It is possible to appropriately suppress a decrease in energy efficiency due to an adjustment of the gear ratio of the CVT 23 during the EV travel mode.

In the example described above with reference to the control flow illustrated in FIG. 5, the speed of the primary shaft 234 has been used as a parameter to determine a timing of disengaging the output clutch 24 after start of an adjustment of the gear ratio. Another parameter may however be used as a parameter to determine a timing of disengaging the output clutch 24. For example, the output clutch 24 may be disengaged in a case where the gear ratio has reached a reference gear ratio after start of an adjustment of the gear ratio. The output clutch 24 may be disengaged in a case where a reference time has passed from start of an adjustment of the gear ratio. the reference gear ratio and the reference time described above may be set to such respective values that it is possible to disengage the output clutch 24 before the gear ratio reaches a target gear ratio, and that change on the basis of the oil temperature or deceleration, for example, like the reference speed described above.

An example of transitions of state quantities in the vehicle in a case where the control flow described above with reference to FIG. 5 is executed during the EV travel mode will now be described below with reference to FIG. 6.

Figure 6:
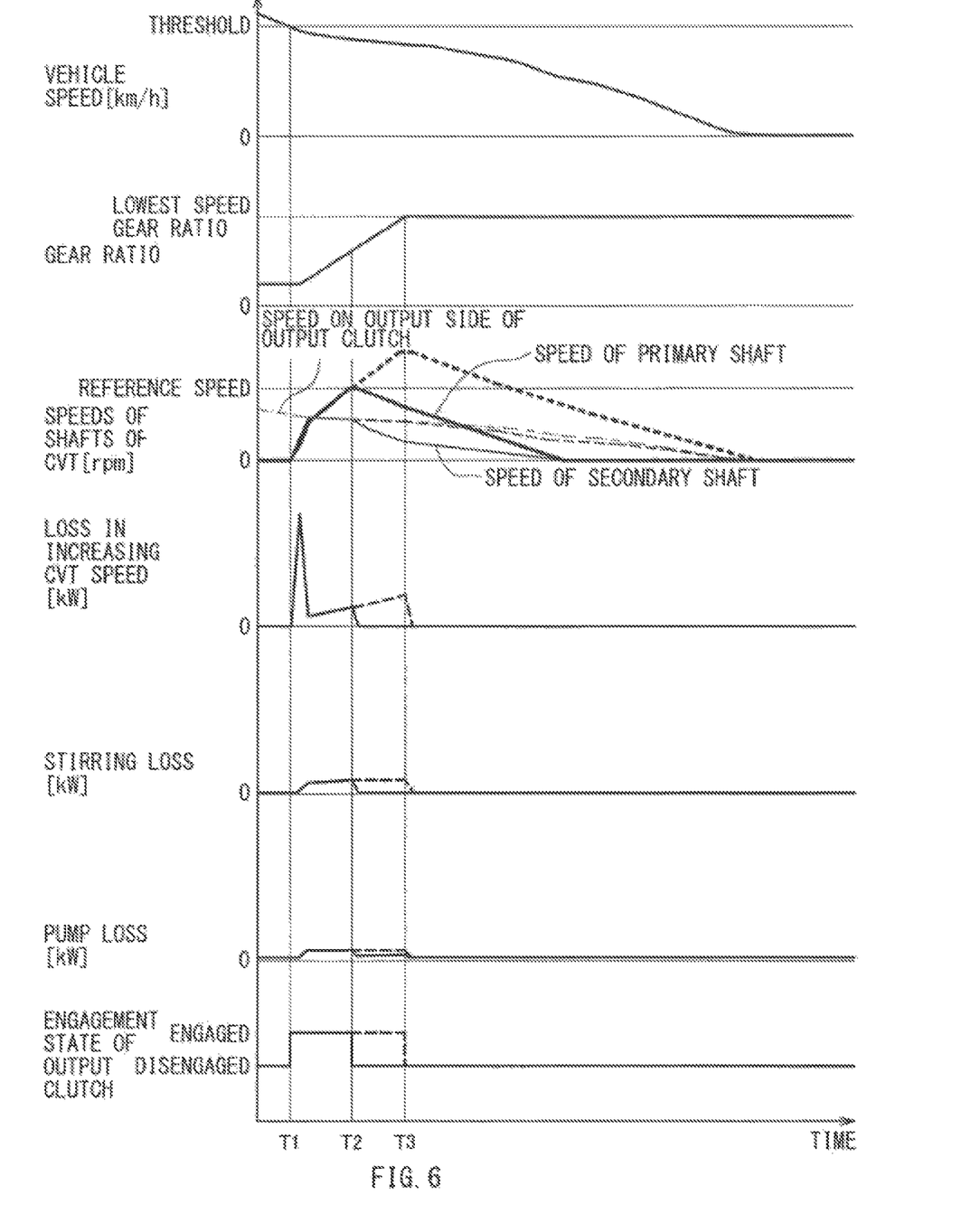
FIG. 6 is a view illustrating an example of transitions of state quantities in the vehicle in a case where a gear ratio has been adjusted to a lowest speed gear ratio during execution of the EV travel mode by the vehicle control apparatus illustrated in FIG. 1.

FIG. 6 is a view illustrating an example of transitions of state quantities in the vehicle in a case where the gear ratio has been adjusted to the lowest speed gear ratio during the EV travel mode. FIG. 6 illustrates, with a dashed line as a comparative example, transitions of state quantities in the vehicle in a case where the output clutch 24 is kept engaged until the gear ratio of the CVT 23 reaches a target gear ratio, i.e., the lowest speed gear ratio, after start of an adjustment of the gear ratio.

In a specific but non-limiting example, FIG. 6 illustrates transitions of state quantities of the vehicle, such as vehicle speed, gear ratio, speed of the primary shaft 234, speed of the secondary shaft 235, loss in increasing CVT speed, stirring loss, and pump loss. FIG. 6 further illustrates a transition of an engagement state of the output clutch 24. The loss in increasing CVT speed and the stirring loss may correspond to examples of energy losses due to that the CVT 23 is rotated by the drive wheels 97. In a specific but non-limiting example, the loss in increasing CVT speed may correspond to energy consumed to increase speeds of the pulleys of the CVT 23. The stirring loss may correspond to energy consumed in a case where the CVT 23 stirs oil in the case of the automatic transmission 2. The pump loss may correspond to energy consumed to drive the electric oil pump 26.

As illustrated in FIG. 6, a decrease in vehicle speed below the threshold at a time T1 while the vehicle is decelerating during the EV travel mode may trigger engagement of the output clutch 24 and start of an adjustment of the gear ratio of the CVT 23 to the lowest speed gear ratio. Before the time T1, such a state may be attained that the output clutch 24 is disengaged and the CVT 23 is stopped from rotating. Before the time T1, such a state may therefore be attained that the primary shaft 234 and the secondary shaft 235 are stopped from rotating and the gear ratio is kept unchanged. Neither the loss in increasing CVT speed nor the stirring loss may therefore basically be generated. There may be a relatively smaller pump loss.

Upon engagement of the output clutch 24 at the time T1, power may be transmitted from the drive wheels 97 to the CVT 23 via the output clutch 24. As illustrated in FIG. 6, the speed of the primary shaft 234 and the speed of the secondary shaft 235 may increase after the time T1. In a state where the output clutch 24 is engaged, the speed of the secondary shaft 235 may be identical to a speed on an output side of the output clutch 24, as illustrated in FIG. 6.

FIG. 6 illustrates that, immediately after the time T1 at which the CVT 23 starts rotating, the loss in increasing CVT speed rises steeply. As the CVT 23 rotates after the time T1, such a state may be attained that a stirring loss is also generated in addition to the loss in increasing CVT speed. Furthermore, the electric oil pump 26 may be driven after the time T1 for engagement of the output clutch 24 and an adjustment of the gear ratio of the CVT 23, making the pump loss relatively greater.

An increase in speed of the primary shaft 234 upon an increase in gear ratio after the time T1, and an increase in speed of the primary shaft 234 above the reference speed at a time T2 may trigger disengagement of the output clutch 24. At the time T2 at which the output clutch 24 is disengaged, the gear ratio may have not yet reached the lowest speed gear ratio as a target gear ratio. The pulleys of the CVT 23 may however continue rotational motions by inertia even after the output clutch 24 is disengaged. This makes it possible to continuously perform an adjustment of the gear ratio after the time T2 by utilizing the rotational inertia of the pulleys of the CVT 23. Even though the speed of the primary shaft 234 and the speed of the secondary shaft 235 lower after the time T2, as illustrated in FIG. 6, an adjustment of the gear ratio may be continuously performed in a state where the pulleys of the CVT 23 continue rotational motions by inertia. The gear ratio may therefore continuously increase. The gear ratio may thereafter reach the lowest speed gear ratio as the target gear ratio at a time T3. The adjustment of the gear ratio may thus end.

In a comparative example where the output clutch 24 is kept engaged until the gear ratio reaches a target gear ratio, as illustrated by the dashed line in FIG. 6, the gear ratio may reach the target gear ratio, i.e., the lowest speed gear ratio, after the time T1 at which the adjustment of the gear ratio of the CVT 23 has started. The output clutch 24 may then be disengaged at the time T3 at which the adjustment of the gear ratio ends. The loss in increasing CVT speed and the stirring loss indicative of energy losses due to that the CVT 23 is rotated may therefore lower at the time T3, as illustrated by the dashed line in FIG. 6. FIG. 6 illustrates, with the dashed line in the comparative example described above, that the speed of the primary shaft 234 and the speed of the secondary shaft 235 may start to lower from the time T3 at which the output clutch 24 is disengaged.

With the controller 52 of the control apparatus 50, the output clutch 24 may be disengaged, after the time T1 at which the adjustment of the gear ratio of the CVT 23 has started, at the time T2 earlier than the time T3 at which the gear ratio reaches the target gear ratio, i.e., the lowest speed gear ratio. Unlike in the comparative example described above, it is therefore possible to attain such a state where the output clutch 24 is disengaged within a period between the time T2 and the time T3. This makes it possible to shorten a time during which the output clutch 24 is engaged. It is therefore possible to decrease the loss in increasing CVT speed and the stirring loss indicative of energy losses generated as the CVT 23 is rotated within a period between the time T2 and the time T3, illustrated in FIG. 6.

Furthermore, in the comparative example described above, the pump loss may lower at the time T3 at which the output clutch 24 is disengaged after the time T1 at which the adjustment of the gear ratio of the CVT 23 has started, as illustrated by the dashed line in FIG. 6. With the controller 52 of the control apparatus 50, it is possible to attain such a state where the output clutch 24 is disengaged within a period between the time T2 and the time T3. This makes it possible to decrease the pump loss within the period between the time T2 and the time T3, compared with the comparative example described above.

3. Example Effects of Control Apparatus

Next, example effects of the control apparatus 50 according to the example embodiment of the disclosure will be described below.

In the control apparatus 50 according to the example embodiment, the controller 52 may engage, in an adjustment of the gear ratio of the CVT 23 during the EV travel mode, the output clutch 24 and may start the adjustment of the gear ratio of the CVT 23. The controller 52 may thereafter disengage the output clutch 24 before the gear ratio reaches a target gear ratio. This makes it possible, in an adjustment of the gear ratio of the CVT 23 during the EV travel mode, to utilize rotational inertia of the pulleys of the CVT 23 to continue the adjustment of the gear ratio, and to shorten a time during which the output clutch 24 is engaged. It is therefore possible, in an adjustment of the gear ratio during the EV travel mode, to suppress generation of energy losses due to that the CVT 23 is rotated. In a specific but non-limiting example, the energy losses may include the loss in increasing CVT speed and the stirring loss described above. Furthermore, it is possible to decrease the pump loss in a case where it is necessary to drive the electric oil pump 26 to engage the output clutch 24. It is therefore also possible to appropriately suppress a decrease in energy efficiency due to an adjustment of the gear ratio of the CVT 23 during the EV travel mode.

In the control apparatus 50 according to the example embodiment, in an adjustment of the gear ratio of the CVT 23 during the EV travel mode, the controller 52 may change a timing of disengaging the output clutch 24 after start of the adjustment of the gear ratio on the basis of the oil temperature indicative of the temperature of the oil in the case accommodating the CVT 23. It is therefore possible to make appropriate a timing of disengaging the output clutch 24 in accordance with the viscosity of the oil to prevent the timing from being too early or late.

In the control apparatus 50 according to the example embodiment, the controller 52 may adjust the gear ratio to the lowest speed gear ratio as a target gear ratio in a case where the vehicle speed of the vehicle has lowered below the threshold during the EV travel mode. This makes it possible to suppress the vehicle from being re-started with power outputted from the engine 11 after the vehicle has come to a halt in a state where the gear ratio is too close to the high speed side. This also makes it possible to suppress the travel mode from being switched to the HEV travel mode and the vehicle from re-accelerating with power outputted from the engine 11 in a state where the gear ratio is too close to the high speed side while the vehicle speed is relatively low. It is therefore possible to suppress a decrease in ease of start when the vehicle uses power outputted from the engine 11 to re-start or in acceleration during re-acceleration.

In the control apparatus 50 according to the example embodiment, in an adjustment of the gear ratio of the CVT 23 during the EV travel mode, the controller 52 may change a speed of change in gear ratio on the basis of deceleration of the vehicle. This makes it possible to change a speed of change in gear ratio in accordance with a time from when an adjustment of the gear ratio is started to when the vehicle comes to a halt. It is therefore possible to appropriately complete the adjustment of the gear ratio before the vehicle comes to a halt.

In the control apparatus 50 according to the example embodiment, in an adjustment of the gear ratio of the CVT 23 during the EV travel mode, the controller 52 may change a timing of disengaging the output clutch 24 after start of the adjustment of the gear ratio on the basis of deceleration of the vehicle. This makes it possible to make appropriate a timing of disengaging the output clutch 24 in accordance with a speed of change in gear ratio to prevent the timing from being too early or late in a case where the speed of change in gear ratio is changed on the basis of deceleration.

In the control apparatus 50 according to the example embodiment, the controller 52, in a case where the threshold described above is designated as a first threshold, may adjust the gear ratio to a high speed side gear ratio as a target gear ratio in a case where the vehicle speed exceeds a second threshold greater than the first threshold during the EV travel mode. This makes it possible to suppress the travel mode from being switched to the HEV travel mode in a state where the gear ratio is too close to the low speed side while the vehicle speed is relatively higher. It is therefore possible to suppress over rotation where the speed of the primary shaft 234 becomes excessive due to switching to the HEV travel mode. Furthermore, also in an adjustment of the gear ratio of the CVT 23, as described above, the output clutch 24 may be engaged, and the adjustment of the gear ratio may be started. The output clutch 24 may thereafter be disengaged before the gear ratio reaches a target gear ratio. This makes it possible to appropriately suppress a decrease in energy efficiency due to an adjustment of the gear ratio.

4. Conclusion

In the control apparatus 50 according to the example embodiment, as described above, in an adjustment of the gear ratio of the CVT 23 during the EV travel mode, the controller 52 may engage the output clutch 24 and may start the adjustment of the gear ratio of the CVT 23, and may thereafter disengage the output clutch 24 before the gear ratio reaches a target gear ratio. This makes it possible, in an adjustment of the gear ratio of the CVT 23 during the EV travel mode, to utilize rotational inertia of the pulleys of the CVT 23 to continue the adjustment of the gear ratio, and to shorten a time during which the output clutch 24 is engaged. This therefore makes it possible to suppress generation of energy losses due to that the CVT 23 is rotated in an adjustment of the gear ratio during the EV travel mode. This also makes it possible to appropriately suppress a decrease in energy efficiency due to an adjustment of the gear ratio during the EV travel mode.

Some example embodiments of the disclosure have been described in detail with reference to the accompanying drawings. However, the disclosure is not limited to the example embodiments. It is apparent that persons skilled in the technical field of the disclosure may perceive various modification examples or application examples within the scope of the technical concept as defined by the following claims. It should be appreciated that the various modification examples or application examples obviously fall within the technical scope of the disclosure.

For example, in the example described above, the power transmission system 1 may be provided, as a continuously variable transmission, with the CVT 23. The CVT 23 may be a chain CVT including the chain 233. A continuously variable transmission provided in the power transmission system 1 is not however limited to the example described above. For example, a continuously variable transmission provided in the power transmission system 1 may be a belt CVT including a belt as a member that transmits power. For example, a continuously variable transmission provided in the power transmission system 1 may be a toroidal CVT.

For example, in the configuration described above with reference to FIG. 1, the power transmission system 1 of the vehicle mounted with the control apparatus 50 is described. A power transmission system of the vehicle mounted with the control apparatus 50 is not however limited to the configuration described above as an example. A configuration may at least include an engine, a continuously variable transmission, a drive motor, and an output clutch. The configuration may have coupling relationships among the components equivalent to coupling relationships of the power transmission system 1 illustrated in FIG. 1. For example, such a power transmission system of a vehicle mounted with the control apparatus 50 may be used that some of the components of the power transmission system 1 illustrated in FIG. 1 are omitted, that an additional component is added to the power transmission system 1, or that a positional relationship between some of the components of the power transmission system 1 is partially changed.

For example, the processes described with reference to the flowchart in the present specification may not be necessarily executed in the order indicated in the flowchart. An additional processing step may be adopted. Some processing steps may be omitted.

The control apparatus 50 illustrated in FIG. 2 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the control apparatus 50. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and an SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of the control apparatus 50 illustrated in FIG. 2.

It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A vehicle control apparatus configured to control a vehicle provided with an engine, a continuously variable transmission coupled to an output shaft of the engine, a drive motor coupled to a drive wheel, and an output clutch configured to allow and disallow transmission of power between an output shaft of the continuously variable transmission, and the drive wheel and the drive motor, the vehicle control apparatus comprising a controller configured to switch and execute either of
   an electric vehicle (EV) travel mode that allows, in a state where the output clutch is disengaged, power outputted from the drive motor to drive the drive wheel, and
   a hybrid electric vehicle (HEV) travel mode that allows, in a state where the output clutch is engaged, both power outputted from the engine and the power outputted from the drive motor to drive the drive wheel,
   the controller being configured to, in an adjustment of a gear ratio of the continuously variable transmission during the EV travel mode, engage the output clutch and start the adjustment of the gear ratio of the continuously variable transmission, and thereafter disengage the output clutch before the gear ratio reaches a target gear ratio.

2. The vehicle control apparatus according to claim 1, wherein the controller is configured to change, in the adjustment of the gear ratio of the continuously variable transmission during the EV travel mode, a timing of disengaging the output clutch after start of the adjustment of the gear ratio on a basis of an oil temperature representing a temperature of oil in a case accommodating the continuously variable transmission.

3. The vehicle control apparatus according to claim 2, wherein the controller is configured to adjust, in a case where a vehicle speed of the vehicle has lowered below a threshold during the EV travel mode, the gear ratio to a lowest speed gear ratio as the target gear ratio.

4. The vehicle control apparatus according to claim 3, wherein the controller is configured to adjust, in a case where the threshold is designated as a first threshold, and in a case where the vehicle speed exceeds a second threshold greater than the first threshold during the EV travel mode, the gear ratio to a high speed side gear ratio as the target gear ratio.

5. The vehicle control apparatus according to claim 3, wherein the controller is configured to change, in the adjustment of the gear ratio of the continuously variable transmission during the EV travel mode, a speed of change in the gear ratio on a basis of deceleration of the vehicle.

6. The vehicle control apparatus according to claim 5, wherein the controller is configured to adjust, in a case where the threshold is designated as a first threshold, and in a case where the vehicle speed exceeds a second threshold greater than the first threshold during the EV travel mode, the gear ratio to a high speed side gear ratio as the target gear ratio.

7. The vehicle control apparatus according to claim 5, wherein the controller is configured to change, in the adjustment of the gear ratio of the continuously variable transmission during the EV travel mode, a timing of disengaging the output clutch after start of the adjustment of the gear ratio on the basis of the deceleration.

8. The vehicle control apparatus according to claim 7, wherein the controller is configured to adjust, in a case where the threshold is designated as a first threshold, and in a case where the vehicle speed exceeds a second threshold greater than the first threshold during the EV travel mode, the gear ratio to a high speed side gear ratio as the target gear ratio.

9. The vehicle control apparatus according to claim 1, wherein the controller is configured to adjust, in a case where a vehicle speed of the vehicle has lowered below a threshold during the EV travel mode, the gear ratio to a lowest speed gear ratio as the target gear ratio.

10. The vehicle control apparatus according to claim 9, wherein the controller is configured to change, in the adjustment of the gear ratio of the continuously variable transmission during the EV travel mode, a speed of change in the gear ratio on a basis of deceleration of the vehicle.

11. The vehicle control apparatus according to claim 9, wherein the controller is configured to adjust, in a case where the threshold is designated as a first threshold, and in a case where the vehicle speed exceeds a second threshold greater than the first threshold during the EV travel mode, the gear ratio to a high speed side gear ratio as the target gear ratio.

12. The vehicle control apparatus according to claim 10, wherein the controller is configured to change, in the adjustment of the gear ratio of the continuously variable transmission during the EV travel mode, a timing of disengaging the output clutch after start of the adjustment of the gear ratio on the basis of the deceleration.

13. The vehicle control apparatus according to claim 10, wherein the controller is configured to adjust, in a case where the threshold is designated as a first threshold, and in a case where the vehicle speed exceeds a second threshold greater than the first threshold during the EV travel mode, the gear ratio to a high speed side gear ratio as the target gear ratio.

14. The vehicle control apparatus according to claim 12, wherein the controller is configured to adjust, in a case where the threshold is designated as a first threshold, and in a case where the vehicle speed exceeds a second threshold greater than the first threshold during the EV travel mode, the gear ratio to a high speed side gear ratio as the target gear ratio.

15. A vehicle control apparatus configured to control a vehicle provided with an engine, a continuously variable transmission coupled to an output shaft of the engine, a drive motor coupled to a drive wheel, and an output clutch configured to allow and disallow transmission of power between an output shaft of the continuously variable transmission, and the drive wheel and the drive motor, the vehicle control apparatus comprising circuitry configured to switch and execute either of
- an electric vehicle (EV) travel mode that allows, in a state where the output clutch is disengaged, power outputted from the drive motor to drive the drive wheel, and
- a hybrid electric vehicle (HEV) travel mode that allows, in a state where the output clutch is engaged, both power outputted from the engine and the power outputted from the drive motor to drive the drive wheel,
- the circuitry being configured to, in an adjustment of a gear ratio of the continuously variable transmission during the EV travel mode, engage the output clutch and start the adjustment of the gear ratio of the continuously variable transmission, and thereafter disengage the output clutch before the gear ratio reaches a target gear ratio.

\* \* \* \* \*